United States Patent [19]

Ando et al.

[11] Patent Number: 4,601,991
[45] Date of Patent: Jul. 22, 1986

[54] ALUMINA PORCELAIN COMPOSITIONS

[75] Inventors: Minato Ando; Masaaki Ito, both of Aichi, Japan

[73] Assignee: NGK Spark Plug Co., Ltd., Aichi, Japan

[21] Appl. No.: 800,855

[22] Filed: Nov. 22, 1985

[30] Foreign Application Priority Data

Feb. 8, 1985 [JP] Japan .................................. 60-23792

[51] Int. Cl.[4] ............................................. C04B 35/10
[52] U.S. Cl. ................................................... 501/153
[58] Field of Search .......................................... 501/153

[56] References Cited

U.S. PATENT DOCUMENTS 3,880,971  4/1975  Pantanelli ............................ 501/153
3,929,496  12/1975 Asano .................................. 501/153
3,935,017  1/1976  Gardner .............................. 501/153
4,177,235  12/1979 Neidhardt et al. ................... 501/153

Primary Examiner—Mark L. Bell
Attorney, Agent, or Firm—Sughrue, Mion, Zinn Macpeak & Seas

[57] ABSTRACT

An alumina porcelain composition is described, consisting essentially of from 99.4 to 99.9% by weight $Al_2O_3$ and a remainder consisting of $SiO_2$, CaO, and MgO within a compositional range defined by the straight lines connecting the following points A, B, and C in the weight basis ternary composition diagram set forth in the attached drawing:

|  | $SiO_2$ | CaO | MgO |
|---|---|---|---|
| Point A | 0.90 | 0.025 | 0.075 |
| Point B | 0.60 | 0.30 | 0.10 |
| Point C | 0.60 | 0.125 | 0.275 |

(unit: weight fraction).

The alumina porcelain composition shows a small high-frequency dielectric loss, and when the composition is utilized as a base for a microwave integrated circuit, the occurrence of problems caused by the cutting of a wiring pattern can be prevented.

3 Claims, 1 Drawing Figure

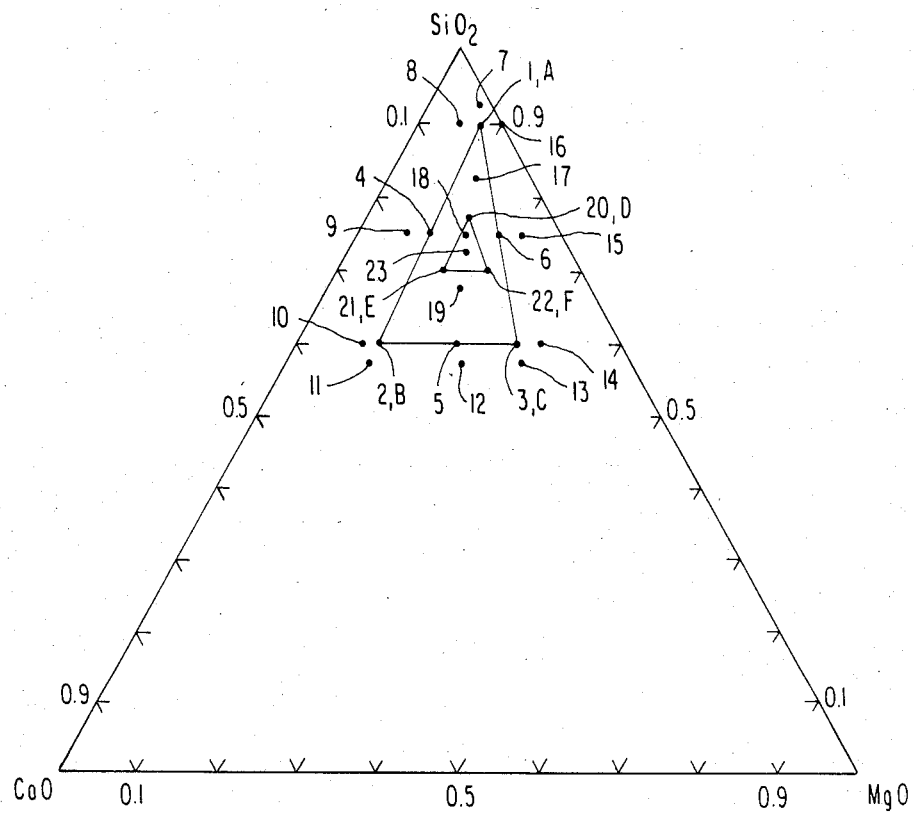

ALUMINA PORCELAIN COMPOSITIONS

FIELD OF THE INVENTION

This invention relates to an alumina porcelain composition which is suitably utilized in uses requiring a material having a small high-frequency dielectric loss as an electric wave medium, such as a microwave waveguide member, a microwave transmission window, a base for a microwave integrated circuit, etc.

BACKGROUND OF THE INVENTION

Since high purity alumina porcelain is excellent in heat resistance, chemical resistance, mechanical strength, etc., and shows a small high-frequency dielectric loss, alumina porcelain is frequently used in a wide variety of arts. However, since the various properties of the porcelain, and particularly the electric properties thereof, may change significantly even upon slight changes of the kind and amount of additives such as sintering aids, etc., the porcelain is unsuitable for practical use as a high-frequency dielectric material which is utilized in the above described uses.

The inventors previously investigated various additives for utilizing alumina porcelains as such high-frequency dielectric materials, and previously proposed an alumina porcelain composition comprising alumina as the main component having added thereto definite amounts of CaO and TiO₂, and an alumina porcelain composition comprising alumina as the main component having added thereto MgO and SiO₂, as described in Japanese Patent Application No. 32113/84 (corresponding to Japanese Patent Application (OPI) No. 176967/85 (the term "OPI" as used herein refers to a "published unexamined Japanese patent application")) and Japanese Patent Application No. 125136/83 (corresponding to Japanese Patent Application (OPI) No. 16861/85), respectively.

Recently, there has been a trend that electrodes and conductive circuits for a microwave integrated circuits are formed as fine lines of thin layers on the polished surface of a base, and hence for preventing the occurrence of problems by cutting of the fine electrodes or circuits, a dense material wherein a pore is absent or if the pore is present the pore has very fine diameter is required for the base. However, the alumina porcelain compositions of the above described Japanese Patent Application Nos. 32113/84 and 125136/83 do not have a denseness as high as might be desired, and dense alumina porcelains which are fully satisfactory as high-frequency dielectric materials have not been heretofore known.

SUMMARY OF THE INVENTION

An object of this invention is, therefore, to provide an alumina porcelain composition which shows less high-frequency dielectric loss and is denser than the alumina porcelain compositions provided by the above described Japanese Patent Application Nos. 32113/84 and 125136/83.

To achieve this object, the present invention provides an alumina porcelain composition consisting essentially of from 99.4 to 99.9% by weight $Al_2O_3$, and a remainder consisting of $SiO_2$, CaO, and MgO within a compositional range defined by straight lines connecting the following points A, B, and C in the weight basis ternary composition diagram set forth in the attached drawing:

|         | SiO₂ | CaO   | MgO   |
|---------|------|-------|-------|
| Point A | 0.90 | 0.025 | 0.075 |
| Point B | 0.60 | 0.30  | 0.10  |
| Point C | 0.60 | 0.125 | 0.275 |

(unit: weight fraction).

BRIEF DESCRIPTION OF THE DRAWING

The drawing is a ternary composition diagram of SiO₂, CaO and MgO.

DESCRIPTION OF PREFERRED EMBODIMENTS

The alumina porcelain of this invention having the above described composition has (a) a dielectric constant (hereafter referred to as "ε") of less than 10, (b) a dielectric power factor (hereafter referred to as "tan δ") of less than $6 \times 10^{-5}$, and (c) a mean pore diameter on the specularly finished surface thereof of less than 20 μm.

A preferred embodiment of the present invention is an alumina porcelain composition consisting essentially of from 99.4 to 99.9% by weight $Al_2O_3$, and a remainder consisting of $SiO_2$, CaO, and MgO within a compositional range defined by straight lines connecting the following points D, E, and F in the weight basis ternary composition diagram set forth in the attached drawing:

|         | SiO₂ | CaO  | MgO  |
|---------|------|------|------|
| Point D | 0.78 | 0.10 | 0.12 |
| Point E | 0.70 | 0.17 | 0.13 |
| Point F | 0.70 | 0.12 | 0.18 |

(unit: weight fraction).

The invention is explained in further detail, but without limitation, by referring to the following example.

EXAMPLE

Sample piece Nos. 201 to 619 were prepared by compounding 500 g of alumina of 99.999% in purity (UA-5055, trademark of product made by Showa Keikinzoku K.K.) and additive components, i.e., silicic acid anhydride (high grade reagent), calcium carbonate (high grade reagent), and magnesium carbonate (high grade reagent) in the 23 component ratios shown in Table 1 below, so that the content of alumina became 99.3% by weight, 99.4% by weight, 99.7% by weight, 99.9% by weight, or 99.95% by weight as oxide as shown in Tables 2, 3, 4, 5, and 6, respectively, placing the compounded composition in a one-liter polyethylene vessel together with 400 ml of demineralized water, 5 g of polyvinyl alcohol, and 2 g of polyethylene glycol, wet-blending the mixture using 2 kg of alumina flint pebbles (20 mm mean diameter) of 99.99% by weight in purity followed by lyophilization, sieving the blended mixture, molding the mixture into cylindrical shape (18.9 mm diameter; and 10.4 mm length) at a pressure of 1,500 kg/cm², sintering the molded product at the sintering temperatures shown in Tables 2 to 6, respectively, and thereafter, polishing both end surfaces of sintered product to a smoothness of 0.1 s and the side surfaces to a smoothness of 0.3 s, together with adjusting the dimensions thereof to 15 mm diameter and 8 mm length.

About each of sample piece Nos. 201 to 619, $\epsilon$, tan $\delta$, and the mean pore diameter were measured under the following conditions:

1. Measurement conditions for $\epsilon$ and tan $\delta$:
   Apparatus: Model 8408B, made by Yokogawa-Hewlett Packard, Ltd.
   Method: Dielectric column resonance method
   Frequency: 8 GHz
   Temperature: 20° C.
2. Measurement condition for mean pore diameter:
   The specularly polished surfaces of each sample piece were photographed at 200 magnifications, and the mean value of the pores having diameters of larger than 5 μm in the vision range of 50 mm × 50 mm of the photograph was calculated.

The results thus obtained are shown in Tables 2 through 6.

TABLE 1

| Component Point No. in Diagram | Component Ratio (weight fraction) Addition Component | | |
|---|---|---|---|
| | SiO$_2$ | CaO | MgO |
| 1 | 0.90 | 0.025 | 0.075 |
| 2 | 0.60 | 0.30 | 0.10 |
| 3 | 0.60 | 0.125 | 0.275 |
| 4 | 0.75 | 0.160 | 0.09 |
| 5 | 0.60 | 0.20 | 0.20 |
| 6 | 0.75 | 0.075 | 0.175 |
| 7 | 0.925 | 0.015 | 0.06 |
| 8 | 0.90 | 0.05 | 0.05 |
| 9 | 0.75 | 0.185 | 0.065 |
| 10 | 0.60 | 0.32 | 0.08 |
| 11 | 0.575 | 0.325 | 0.10 |
| 12 | 0.575 | 0.2125 | 0.2125 |
| 13 | 0.575 | 0.135 | 0.29 |
| 14 | 0.60 | 0.10 | 0.30 |
| 15 | 0.75 | 0.05 | 0.20 |
| 16 | 0.90 | 0 | 0.10 |
| 17 | 0.825 | 0.07 | 0.105 |
| 18 | 0.75 | 0.115 | 0.135 |
| 19 | 0.675 | 0.165 | 0.16 |
| 20 | 0.78 | 0.10 | 0.12 |
| 21 | 0.70 | 0.17 | 0.13 |
| 22 | 0.70 | 0.12 | 0.18 |
| 23 | 0.73 | 0.13 | 0.14 |

TABLE 2

| Sample No. | Al$_2$O$_3$ Content (wt %) | Addition Component Content (wt %) | Component Point No. | tan $\delta$ (× 10$^{-5}$) | Mean Pore Diameter (μm) | $\epsilon$ | Sintering Temperature (°C.) | Note |
|---|---|---|---|---|---|---|---|---|
| 201 | 99.3 | 0.7 | 1 | 6.5 | 21 | 9.7 | 1,570 | Outside* |
| 202 | " | " | 2 | 7.4 | 16 | 9.8 | 1,510 | " |
| 203 | " | " | 3 | 7.3 | 12 | 9.8 | 1,510 | " |
| 204 | " | " | 4 | 6.8 | 17 | 9.8 | 1,530 | " |
| 205 | " | " | 5 | 6.6 | 13 | 9.8 | 1,510 | " |
| 206 | " | " | 6 | 6.8 | 17 | 9.7 | 1,530 | " |
| 207 | " | " | 7 | 9.6 | 22 | 9.6 | 1,620 | " |
| 208 | " | " | 8 | 7.1 | 23 | 9.6 | 1,600 | " |
| 209 | " | " | 9 | 9.4 | 22 | 9.8 | 1,540 | " |
| 210 | " | " | 10 | 13.1 | 21 | 9.8 | 1,500 | " |
| 211 | " | " | 11 | 14.9 | 15 | 9.9 | 1,500 | " |
| 212 | " | " | 12 | 15.4 | 13 | 9.9 | 1,490 | " |
| 213 | " | " | 13 | 12.1 | 10 | 9.8 | 1,520 | " |
| 214 | " | " | 14 | 14.0 | 9 | 9.9 | 1,530 | " |
| 215 | " | " | 15 | 12.1 | 19 | 9.8 | 1,540 | " |
| 216 | " | " | 16 | 14.4 | 22 | 9.7 | 1,590 | " |
| 217 | " | " | 17 | 6.3 | 17 | 9.8 | 1,540 | " |
| 218 | " | " | 18 | 6.0 | 16 | 9.8 | 1,530 | " |
| 219 | " | " | 19 | 6.4 | 18 | 9.8 | 1,520 | " |

*Outside of the composition of the invention.

TABLE 3

| Sample No. | Al$_2$O$_3$ Content (wt %) | Addition Component Content (wt %) | Component Point No. | tan $\delta$ (× 10$^{-5}$) | Mean Pore Diameter (μm) | $\epsilon$ | Sintering Temperature (°C.) | Note |
|---|---|---|---|---|---|---|---|---|
| 301 | 99.4 | 0.6 | 1 | 4.4 | 19 | 9.7 | 1,580 | Inside** |
| 302 | " | " | 2 | 5.9 | 12 | 9.8 | 1,510 | " |
| 303 | " | " | 3 | 5.8 | 10 | 9.8 | 1,520 | " |
| 304 | " | " | 4 | 6.0 | 17 | 9.8 | 1,540 | " |
| 305 | " | " | 5 | 5.8 | 11 | 9.8 | 1,510 | " |
| 306 | " | " | 6 | 5.7 | 16 | 9.7 | 1,540 | " |
| 307 | " | " | 7 | 8.1 | 25 | 9.5 | 1,630 | Outside* |
| 308 | " | " | 8 | 6.7 | 22 | 9.6 | 1,650 | " |
| 309 | " | " | 9 | 7.1 | 19 | 9.8 | 1,550 | " |
| 310 | " | " | 10 | 7.4 | 16 | 9.8 | 1,510 | " |
| 311 | " | " | 11 | 8.6 | 15 | 9.8 | 1,500 | " |
| 312 | " | " | 12 | 8.9 | 10 | 9.9 | 1,500 | " |
| 313 | " | " | 13 | 6.9 | 8 | 9.9 | 1,530 | " |
| 314 | " | " | 14 | 8.2 | 8 | 9.9 | 1,540 | " |
| 315 | " | " | 15 | 7.6 | 19 | 9.8 | 1,550 | " |
| 316 | " | " | 16 | 8.4 | 21 | 9.8 | 1,600 | " |
| 317 | " | " | 17 | 4.2 | 17 | 9.7 | 1,550 | Inside** |
| 318 | " | " | 18 | 3.6 | 15 | 9.8 | 1,540 | " |

TABLE 3-continued

| Sample No. | Al$_2$O$_3$ Content (wt %) | Addition Component Content (wt %) | Component Point No. | tan δ (× 10$^{-5}$) | Mean Pore Diameter (μm) | ε | Sintering Temperature (°C.) | Note |
|---|---|---|---|---|---|---|---|---|
| 319 | " | " | 19 | 4.0 | 17 | 9.8 | 1,530 | " |

*Outside of the composition of the invention.
**Inside of the composition of the invention.

TABLE 4

| Sample No. | Al$_2$O$_3$ Content (wt %) | Addition Component Content (wt %) | Component Point No. | tan δ (× 10$^{-5}$) | Mean Pore Diameter (μm) | ε | Sintering Temperature (°C.) | Note |
|---|---|---|---|---|---|---|---|---|
| 401 | 99.7 | 0.3 | 1 | 3.6 | 19 | 9.6 | 1,680 | Inside** |
| 402 | " | " | 2 | 4.3 | 18 | 9.8 | 1,650 | " |
| 403 | " | " | 3 | 4.0 | 18 | 9.9 | 1,650 | " |
| 404 | " | " | 4 | 4.2 | 19 | 9.7 | 1,660 | " |
| 405 | " | " | 5 | 3.9 | 18 | 10.0 | 1,650 | " |
| 406 | " | " | 6 | 3.7 | 19 | 9.8 | 1,670 | " |
| 407 | " | " | 7 | 8.8 | 24 | 9.6 | 1,700 | Outside* |
| 408 | " | " | 8 | Unsintered*** | | | | " |
| 409 | " | " | 9 | 5.8 | 25 | 9.7 | 1,660 | " |
| 410 | " | " | 10 | 6.2 | 22 | 9.8 | 1,650 | " |
| 411 | " | " | 11 | 6.4 | 22 | 9.8 | 1,650 | " |
| 412 | " | " | 12 | 5.5 | 23 | 10.3 | 1,640 | " |
| 413 | " | " | 13 | 6.8 | 21 | 10.0 | 1,650 | " |
| 414 | " | " | 14 | 7.1 | 21 | 9.9 | 1,660 | " |
| 415 | " | " | 15 | 5.1 | 24 | 9.7 | 1,670 | " |
| 416 | " | " | 16 | 5.7 | 26 | 9.6 | 1,680 | " |
| 417 | " | " | 17 | 3.2 | 17 | 9.7 | 1,670 | Inside** |
| 418 | " | " | 18 | 2.3 | 16 | 9.8 | 1,660 | " |
| 419 | " | " | 19 | 3.0 | 23 | 9.9 | 1,660 | " |
| 420 | " | " | 20 | 3.0 | 16 | 9.8 | 1,660 | " |
| 421 | " | " | 21 | 2.9 | 18 | 9.8 | 1,660 | " |
| 422 | " | " | 22 | 2.8 | 19 | 9.8 | 1,660 | " |
| 423 | " | " | 23 | 2.0 | 15 | 9.8 | 1,660 | " |

*Outside of the composition of the invention.
**Inside of the composition of the invention.
***The molded product rich in SiO$_2$ is difficult to be sintered.

TABLE 5

| Sample No. | Al$_2$O$_3$ Content (wt %) | Addition Component Content (wt %) | Component Point No. | tan δ (× 10$^{-5}$) | Mean Pore Diameter (μm) | ε | Sintering Temperature (°C.) | Note |
|---|---|---|---|---|---|---|---|---|
| 501 | 99.9 | 0.1 | 1 | 5.7 | 19 | 9.7 | 1,690 | Inside** |
| 502 | " | " | 2 | 6.0 | 18 | 9.8 | 1,660 | " |
| 503 | " | " | 3 | 5.4 | 17 | 9.8 | 1,670 | " |
| 504 | " | " | 4 | 5.5 | 19 | 9.7 | 1,660 | " |
| 505 | " | " | 5 | 5.4 | 19 | 9.8 | 1,660 | " |
| 506 | " | " | 6 | 5.8 | 20 | 9.7 | 1,670 | " |
| 507 | " | " | 7 | Unsintered*** | | | | Outside* |
| 508 | " | " | 8 | " | | | | " |
| 509 | " | " | 9 | 6.9 | 25 | 9.7 | 1,660 | " |
| 510 | " | " | 10 | 7.7 | 23 | 9.7 | 1,650 | " |
| 511 | " | " | 11 | 8.2 | 24 | 9.8 | 1,660 | " |
| 512 | " | " | 12 | 6.8 | 20 | 9.9 | 1,650 | " |
| 513 | " | " | 13 | 7.4 | 22 | 9.8 | 1,660 | " |
| 514 | " | " | 14 | 8.3 | 19 | 9.9 | 1,670 | " |
| 515 | " | " | 15 | 6.8 | 28 | 9.7 | 1,670 | " |
| 516 | " | " | 16 | 7.0 | 22 | 9.7 | 1,690 | " |
| 517 | " | " | 17 | 5.0 | 17 | 9.7 | 1,680 | Inside** |
| 518 | " | " | 18 | 4.1 | 16 | 9.7 | 1,680 | " |
| 519 | " | " | 19 | 5.1 | 17 | 9.8 | 1,670 | " |

*Outside of the composition of the invention.
**Inside of the composition of the invention.
***The molded product rich in SiO$_2$ is difficult to be sintered.

TABLE 6

| Sample No. | Al$_2$O$_3$ Content (wt %) | Addition Component Content (wt %) | Component Point No. | tan δ (× 10$^{-5}$) | Mean Pore Diameter (μm) | ε | Sintering Temperature (°C.) | Note |
|---|---|---|---|---|---|---|---|---|
| 601 | 99.95 | 0.05 | 1 | 6.8 | 22 | 9.8 | 1,700 | Outside* |
| 602 | " | " | 2 | 7.1 | 20 | 9.9 | 1,680 | " |
| 603 | " | " | 3 | 6.5 | 20 | 9.9 | 1,680 | " |
| 604 | " | " | 4 | 7.0 | 21 | 9.9 | 1,690 | " |
| 605 | " | " | 5 | 6.8 | 20 | 9.8 | 1,680 | " |

TABLE 6-continued

| Sample No. | Al$_2$O$_3$ Content (wt %) | Addition Component Content (wt %) | Component Point No. | tan δ (× 10$^{-5}$) | Mean Pore Diameter (μm) | ε | Sintering Temperature (°C.) | Note |
|---|---|---|---|---|---|---|---|---|
| 606 | " | " | 6 | 7.3 | 21 | 9.8 | 1,680 | " |
| 607 | " | " | 7 | | Unsintered*** | | | " |
| 608 | " | " | 8 | | " | | | " |
| 609 | " | " | 9 | 8.6 | 27 | 9.7 | 1,690 | " |
| 610 | " | " | 10 | 8.1 | 24 | 9.8 | 1,680 | " |
| 611 | " | " | 11 | 8.9 | 24 | 10.0 | 1,680 | " |
| 612 | " | " | 12 | 7.6 | 22 | 10.0 | 1,680 | " |
| 613 | " | " | 13 | 7.9 | 20 | 10.2 | 1,680 | " |
| 614 | " | " | 14 | 7.8 | 22 | 10.2 | 1,680 | " |
| 615 | " | " | 15 | 8.4 | 22 | 9.9 | 1,690 | " |
| 616 | " | " | 16 | 8.8 | 25 | 9.8 | 1,700 | " |
| 617 | " | " | 17 | 6.7 | 18 | 9.8 | 1,690 | " |
| 618 | " | " | 18 | 6.6 | 17 | 9.9 | 1,690 | " |
| 619 | " | " | 19 | 6.9 | 19 | 10.0 | 1,680 | " |

*Outside of the composition of the invention.
***The molded product rich in SiO$_2$ is difficult to be sintered.

From the results shown in Tables 1 to 6, it can be seen that in the sample pieces of this invention having the compositions as defined in this invention, $\epsilon \leq 10$, tan $\delta \leq 6 \times 10^{-5}$, and the mean pore diameter $\leq 20$ μm, but in the comparison sample pieces having compositions outside the composition defined in this invention, at least one of $\epsilon$, tan $\delta$, and the mean pore diameter is higher than the desired value.

As described above, the alumina porcelain composition of this invention shows a small high-frequency dielectric loss and also when the porcelain composition is utilized as a base for a microwave integrated circuit, the occurrence of problems caused by the cutting of a wiring pattern can be prevented.

While the invention has been described in detail and with reference to specific embodiments thereof, it will be apparent to one skilled in the art that various changes and modifications can be made therein without departing from the spirit and scope thereof.

What is claimed is:

1. An alumina porcelain composition consisting essentially of from 99.4 to 99.9% by weight Al$_2$O$_3$ and a remainder consisting of SiO$_2$, CaO, and MgO within a compositional range defined by the straight lines connecting the following points A, B, and C in the weight basis ternary composition diagram set forth in the attached drawing:

| | SiO$_2$ | CaO | MgO |
|---|---|---|---|
| Point A | 0.90 | 0.025 | 0.075 |
| Point B | 0.60 | 0.30 | 0.10 |
| Point C | 0.60 | 0.125 | 0.275 |

(unit: weight fraction).

2. An alumina porcelain composition as in claim 1, wherein the compositional range for the remainder is defined by the straight lines connecting the following points D, E, and F in the weight basis ternary composition diagram set forth in the attached drawing:

| | SiO$_2$ | CaO | MgO |
|---|---|---|---|
| Point D | 0.78 | 0.10 | 0.12 |
| Point E | 0.70 | 0.17 | 0.13 |
| Point F | 0.70 | 0.12 | 0.18 |

(unit: weight fraction).

3. An alumina porcelain composition as in claim 1, having a dielectric constant $\epsilon$ of less than 9.9, a dielectric power factor of less than $5.9 \times 10^{-5}$, and a mean pore diameter of less than 19.

* * * * *